US012033769B2

(12) United States Patent
Matlack et al.

(10) Patent No.: US 12,033,769 B2
(45) Date of Patent: Jul. 9, 2024

(54) CABLES FOR CABLE DEPLOYED ELECTRIC SUBMERSIBLE PUMPS

(71) Applicant: Schlumberger Technology Corporation, Sugar Land, TX (US)

(72) Inventors: Bradley Matlack, Shawnee, KS (US); Varun Vinaykumar Nyayadhish, Lawrence, KS (US); Gregory Howard Manke, Overland Park, KS (US); Patrick Zhiyuan Ma, Lawrence, KS (US); Jason Holzmueller, Lawrence, KS (US); Vincent Gerstner, Overland Park, KS (US); William Goertzen, Lawrence, KS (US); Douglas Pipchuk, Calgary (CA); Joseph Varkey, Richmond, TX (US); Juan Amado, Houston, TX (US); Willem Wijnberg, Houston, TX (US); Maria Grisanti, Missouri City, TX (US); Xiaohong Ren, Sugar land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 335 days.

(21) Appl. No.: 17/753,401

(22) PCT Filed: Sep. 3, 2020

(86) PCT No.: PCT/US2020/049108

§ 371 (c)(1),
(2) Date: Mar. 2, 2022

(87) PCT Pub. No.: WO2021/046158

PCT Pub. Date: Mar. 11, 2021

(65) Prior Publication Data

US 2022/0301740 A1 Sep. 22, 2022

Related U.S. Application Data

(60) Provisional application No. 62/895,113, filed on Sep. 3, 2019.

(51) Int. Cl.
*H01B 7/04* (2006.01)
*E21B 19/22* (2006.01)
(Continued)

(52) U.S. Cl.
CPC ............. *H01B 7/046* (2013.01); *E21B 19/22* (2013.01); *E21B 43/128* (2013.01); *H01B 7/184* (2013.01); *H01B 9/006* (2013.01)

(58) Field of Classification Search
CPC .......... H01B 7/046; H01B 7/184; H01B 7/42; H01B 9/006; E21B 19/22; E21B 43/128
See application file for complete search history.

(56) References Cited

U.S. PATENT DOCUMENTS

| | | | |
|---|---|---|---|
| 5,269,377 | A | 12/1993 | Martin |
| 5,821,452 | A | 10/1998 | Neuroth et al. |

(Continued)

FOREIGN PATENT DOCUMENTS

| | | | |
|---|---|---|---|
| CN | 103903759 | A | 7/2014 |
| GB | 2458557 | A | 9/2009 |
| WO | 2013059315 | A1 | 4/2013 |

OTHER PUBLICATIONS

International Search Report and Written Opinion of PCT Application No. PCT/US2020/049108, dated Dec. 15, 2020 (10 pages).

(Continued)

*Primary Examiner* — Hoa C Nguyen
*Assistant Examiner* — Amol H Patel
(74) *Attorney, Agent, or Firm* — Jeffrey D. Frantz

(57) ABSTRACT

Various cables for cable deployed electric submersible pumping systems and methods of manufacturing such cables
(Continued)

are provided. The cable includes a power cable core and coiled tubing formed around the power cable core. The power cable core includes one or more conductors, insulation surrounding each conductor, and an elastomeric jacket extruded around the insulated conductors. Various mechanisms, systems, and methods are described to anchor the power cable core in the coiled tubing and to transfer weight from the power cable core to the coiled tubing.

20 Claims, 14 Drawing Sheets

(51) Int. Cl.

| | |
|---|---|
| ***E21B 43/12*** | (2006.01) |
| ***H01B 7/18*** | (2006.01) |
| ***H01B 7/42*** | (2006.01) |
| ***H01B 9/00*** | (2006.01) |

(56) References Cited

U.S. PATENT DOCUMENTS

| | | | | |
|---|---|---|---|---|
| 6,143,988 | A | 11/2000 | Neuroth et al. | |
| 7,373,991 | B2 | 5/2008 | Vaidya et al. | |
| 7,562,709 | B2 | 7/2009 | Saebi et al. | |
| 7,665,537 | B2 | 2/2010 | Patel et al. | |
| 7,836,960 | B2 | 11/2010 | Patel et al. | |
| 7,905,295 | B2 | 3/2011 | Mack | |
| 7,938,176 | B2 | 5/2011 | Patel | |
| 7,938,191 | B2 | 5/2011 | Vaidya | |
| 8,272,448 | B2 | 9/2012 | Mack | |
| 8,499,843 | B2 | 8/2013 | Patel et al. | |
| 8,550,103 | B2 | 10/2013 | Chen et al. | |
| 8,752,625 | B2 | 6/2014 | Tibbles | |
| 9,281,675 | B2 | 3/2016 | Cox | |
| 9,587,445 | B2 | 3/2017 | Dalrymple et al. | |
| 10,036,210 | B2 | 7/2018 | Maclean et al. | |
| 10,043,600 | B1 * | 8/2018 | Shangguan | E21B 43/128 |
| 10,262,768 | B2 | 4/2019 | Holzmueller et al. | |
| 11,053,752 | B2 | 7/2021 | Mack et al. | |
| 2007/0046115 | A1 | 3/2007 | Tetzlaff et al. | |
| 2008/0308280 | A1 * | 12/2008 | Head | E21B 17/206<br>166/384 |
| 2009/0139710 | A1 | 6/2009 | Robisson et al. | |
| 2010/0116496 | A1 | 5/2010 | Allen et al. | |
| 2013/0183177 | A1 | 7/2013 | Manke et al. | |
| 2013/0312996 | A1 | 11/2013 | Nicholson | |
| 2014/0190706 | A1 * | 7/2014 | Varkey | E21B 43/128<br>166/66.4 |
| 2016/0047210 | A1 | 2/2016 | Pinkston et al. | |
| 2016/0258231 | A1 | 9/2016 | Naumann et al. | |
| 2018/0202242 | A1 | 7/2018 | OGrady et al. | |
| 2018/0350488 | A1 | 12/2018 | Varkey et al. | |
| 2019/0234155 | A1 * | 8/2019 | Mack | E21B 17/206 |
| 2019/0326036 | A1 * | 10/2019 | Duan | H01B 13/22 |
| 2020/0243218 | A1 | 7/2020 | Goertzen et al. | |
| 2021/0143788 | A1 * | 5/2021 | Crane | H03H 7/42 |

OTHER PUBLICATIONS

International Preliminary Report of Patentability of PCT Application No. PCT/US2020/049108, dated Mar. 17, 2022 (6 pages).

Tapes up to 5" wide Corrugating Machine, downloaded from http://www.webscher.com/p1-4-1.html on Apr. 22, 2022, © 2017-2020 (1 page).

Corrugated Tape Forming System, downloaded from http://www.webscher.com/p1-6-1.html on Apr. 22, 2022, © 2017-2020 (1 page).

Butt weld splicing machine, Downloaded from http://www.webscher.com/p1-1-1.html on Apr. 22, 2022, © 2017-2020 (1 page).

* cited by examiner

CABLES FOR CABLE DEPLOYED ELECTRIC SUBMERSIBLE PUMPS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is the National Stage Entry of International Application No. PCT/US2020/049108, filed Sep. 3, 2020, which claims priority benefit of U.S. Provisional Application No. 62/895,113, filed Sep. 3, 2019, the entirety of which is incorporated by reference herein and should be considered part of this specification.

BACKGROUND

Field

The present disclosure generally relates to cables for cable deployed electric submersible pumping systems.

Description of the Related Art

In many hydrocarbon well applications, electric submersible pumping (ESP) systems are used for pumping of fluids, e.g. hydrocarbon-based fluids. For example, the ESP system may be used to pump oil from a downhole wellbore location to a surface collection location. When deployed in a well, a power cable extends from the surface to the ESP to supply power to the ESP. Production tubing extends from the surface to the ESP and conveys fluids produced by the ESP to the surface. As a traditional power cable cannot support its weight or the weight of the ESP, the production tubing also typically supports the ESP. In many cases, the power cable extends alongside and is secured to the production tubing. A workover rig is used to deploy and retrieve the ESP, for example, for production and repair or replacement, respectively. In some cases, the power cable is disposed within coiled tubing, which can support the weight of the power cable and ESP, and advantageously allow the ESP to be deployed and/or retrieved without a workover rig.

SUMMARY

The present disclosure provides various systems and methods for installing a power cable in coiled tubing and/or for transferring weight from the power cable to the coiled tubing.

In some configurations, a cable for a cable-deployed ESP system includes coiled tubing and a power cable core disposed within the coiled tubing. The coiled tubing is formed around the power cable core. The power cable core includes one or more conductors; insulation surrounding each of the one or more conductors; and a jacket surrounding the insulation and the one or more conductors.

The cable can include a corrugated armor layer disposed between the power cable core and the coiled tubing. The jacket can have a cross-sectional geometry comprising two or more portions having an outer diameter that exceeds an inner diameter of the coiled tubing and that contact an inner surface of the coiled tubing to create an interference fit with the coiled tubing and secure the power cable core in the coiled tubing. The cable can include one or more strength members embedded in the jacket. The strength members can include wire rope. The cable can include wire armor disposed between the power cable core and the coiled tubing. The cable can include a corrosion resistant cladding applied to an outer surface of the coiled tubing. The corrosion resistant cladding can be applied to the coiled tubing via flame spray or high velocity oxygen fuel spray. An epoxy layer can be applied over the corrosion resistant cladding. The jacket can have a base having a circular cross-sectional profile and a plurality of protrusions projecting radially outwardly from the base. The cable can include a layer of interlocking galvanized steel heat-shielding tape disposed between the power cable core and the coiled tubing.

The jacket can include a material configured to swell in response to an activating fluid. In some such embodiments, the cable can include a barrier jacket surrounding the insulation and disposed between the insulation and the jacket, the barrier jacket configured to anchor the jacket such that the jacket swells radially outwardly rather than longitudinally in response to the activating fluid. In some embodiments, the jacket has a splined cross-sectional geometry such that the cable comprises voids between portions of the jacket and the coiled tubing when the jacket is in a swollen state. The activating fluid can be water, brine, or hydrocarbon oil.

A method of forming a cable can include forming the coiled tubing around the power cable core and welding along a seam of the coiled tubing with the jacket in a non-swollen state such that there is a void between at least a portion of the jacket and the coiled tubing. The method can further include introducing the activating fluid into the cable, causing the jacket to swell into the void and anchor the power cable core against an inner surface of the coiled tubing.

In some configurations, a cable for a cable-deployed ESP system includes coiled tubing and three conductors, each conductor encased in a tube, wherein the three tubes are helically twisted and disposed in the coiled tubing.

In some configurations, a cable for a cable-deployed ESP system includes coiled tubing and three conductors, each conductor encased in a tube, wherein the three tubes are disposed in the coiled tubing and arranged parallel to each other and a longitudinal axis of the coiled tubing.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
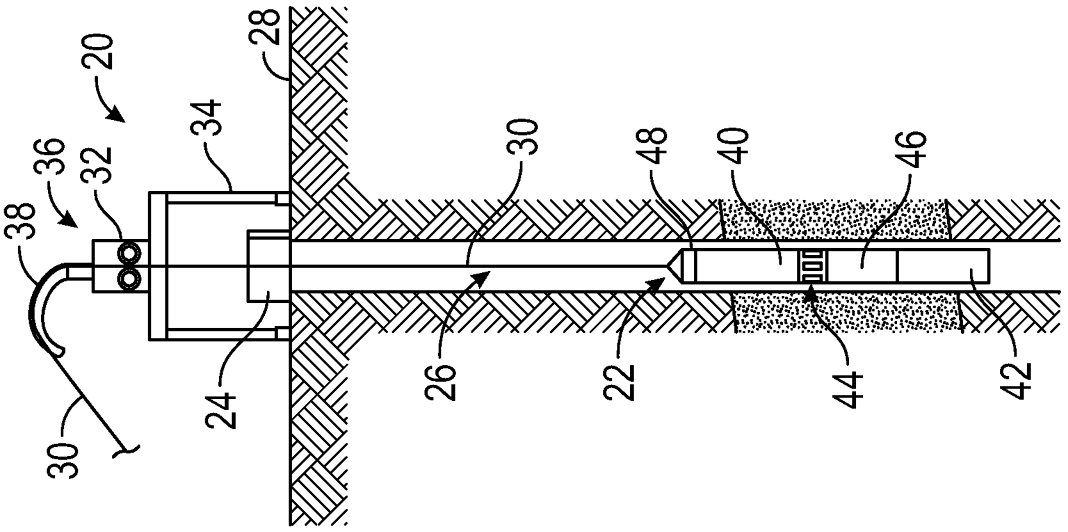
FIG. 1 shows a schematic illustration of a well system including an example of a cable deployed electric submersible pumping system positioned in a wellbore.

FIG. 1 illustrates an example of a system 20 for deploying a pumping system 22. The pumping system 22 is deployed beneath a wellhead 24 and moved downhole to a desired location in a wellbore 26. The wellhead 24 is positioned at a surface location 28, which may be a land surface or a subsea surface. In the illustrated configuration, the pumping system 22 is deployed downhole on a cable 30. According to embodiments of the present disclosure, the cable 30 can include a power cable 100 disposed within coiled tubing 150, as described in greater detail herein.

The cable 30 may be conveyed downhole via an injection head 32, such as a coiled tubing injection head, or other suitable equipment positioned over the wellhead 24. The injection head 32 may be located over wellhead 24 by an adjustable system 34, e.g. a jack stand, a crane, or another suitable system, which is adjustable in height. In some configurations, the injection head 32 comprises a coiled tubing injection head that is part of an overall coiled tubing injection head system 36 having a guide arch or goose neck 38. The guide arch 38 is coupled with the injection head 32 so as to help guide electrical cable 30 into and through the injection head 32 when the electrical cable 30 is used to convey pumping system 22 downhole into wellbore 26. In some applications, the injection head 32 may be mounted above and separate from the stand 34.

In a variety of applications, the pumping system 22 is in the form of an electric submersible pumping system, which may have many types of electric submersible pumping system components. Examples of electric submersible pumping system components include a submersible pump 40 powered by a submersible motor 42. The electric submersible pumping system components also may comprise a pump intake 44, a motor protector 46, and a system coupling 48 by which the electric submersible pumping system 22 is coupled with electrical cable 30. In many applications, the submersible motor 42 may be in the form of a submersible, centrifugal motor powered via electricity supplied by the power cable 100. The submersible motor 42 may be operated to pump injection fluids and/or production fluids. In some applications, the pumping system 22 may comprise an inverted electric submersible pumping system in which the pumping system components are arranged with the submersible pump 40 below the submersible motor 42. However, pumping system 22 may comprise a variety of pumping systems and pumping system components.

In use, the pumping system 22, e.g. electric submersible pumping system (ESP), is coupled to the cable 30. The cable 30 is routed through the coiled tubing injector head 32 and wellhead 24. The cable 30 is able to support the weight of pumping system 22 and is thus able to convey the pumping system 22 to a desired position in wellbore 26 without the aid of a rig.

Figure 2A:
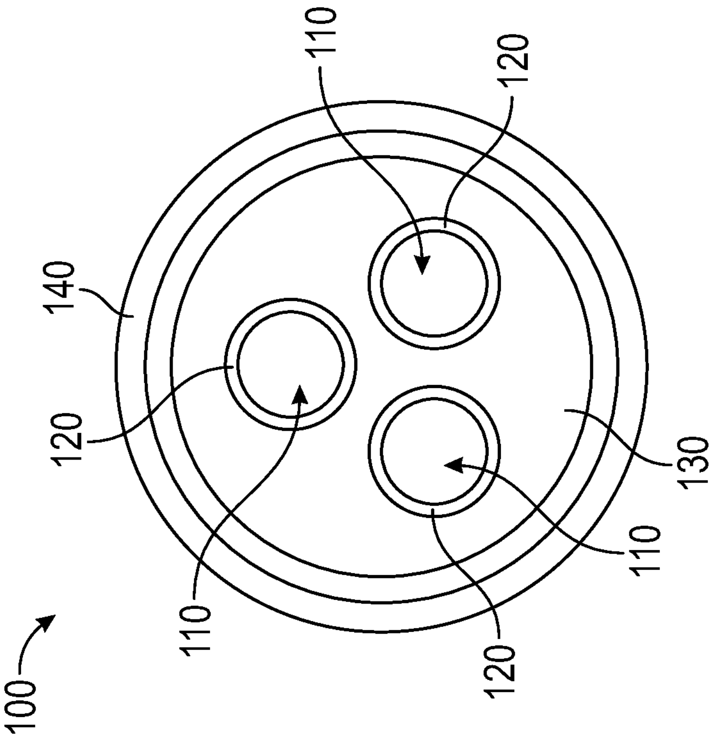
FIG. 2A shows a cross-section of an example power cable.
Figure 2B:
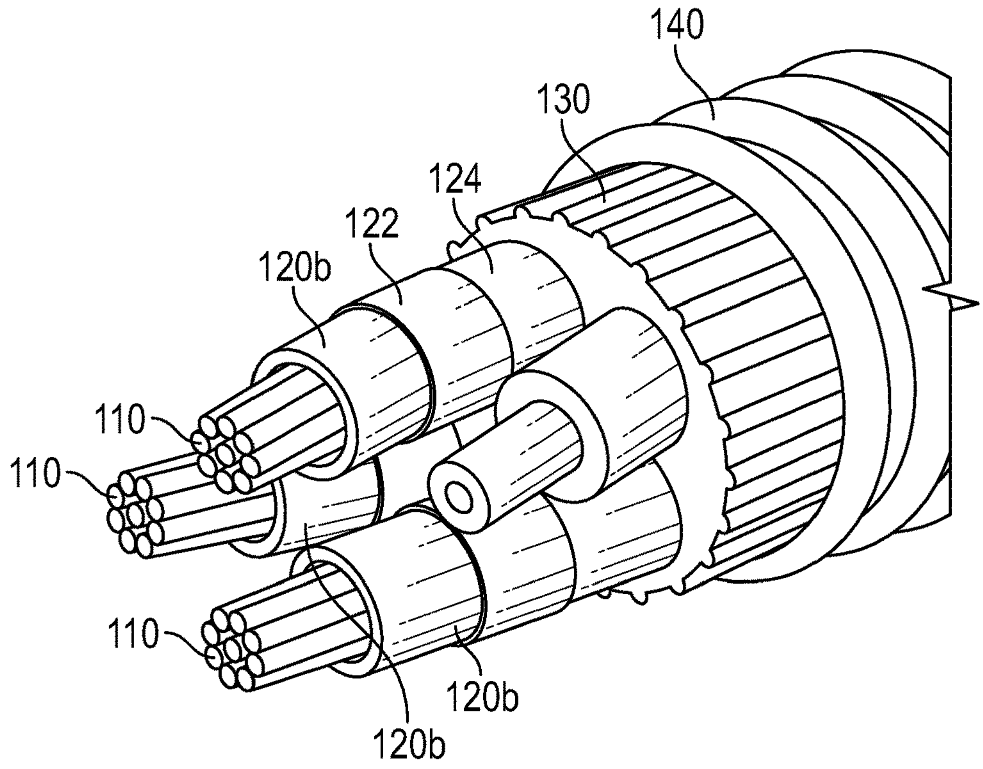
FIG. 2B shows a portion of an example power cable including conductors arranged in a helical configuration.
Figure 2C:
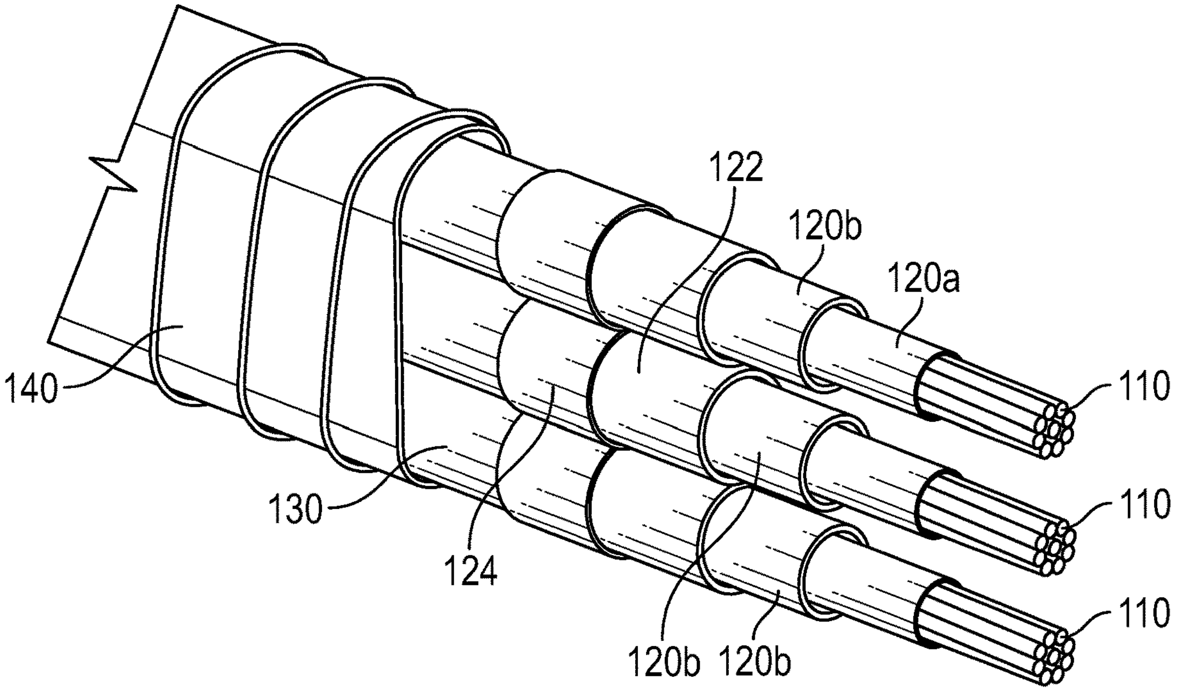
FIG. 2C shows a portion of an example power cable including conductors arranged in a parallel configuration.

As shown in the cross-sectional view of FIG. 2A, the power cable 100 includes one or more, typically three as shown in the illustrated configuration, conductors 110. The conductors 110 can be arranged in a generally helical configuration, for example as shown in FIG. 2B, to create a power cable 100 having an overall round cross-sectional shape. Alternatively, the conductors 110 can be arranged in a parallel configuration, for example as shown in FIG. 2C, to form a more flattened or stadium shape. The conductors 110 are made of or include a conductive material, for example, copper. At least one layer of insulation 120, e.g., tape wrapped insulation 120*a* as shown in FIG. 2C, and/or extruded insulation 120*b* as shown in FIGS. 2B and 2C, can surround each conductor 110. In some configurations, a lead sheath 122 surrounds the insulation 120. In some configurations, a protective braid or extruded layer 124 surrounds the lead sheath (if present) and/or the insulation 120. An elastomeric jacket 130 is extruded around all of the conductors 110 (and the insulation 120 and, if present, the lead sheath 122 and/or protective braid or extruded layer 124) to form a power cable core 102. An armor layer 140 can surround the jacket 130.

Figure 2D:
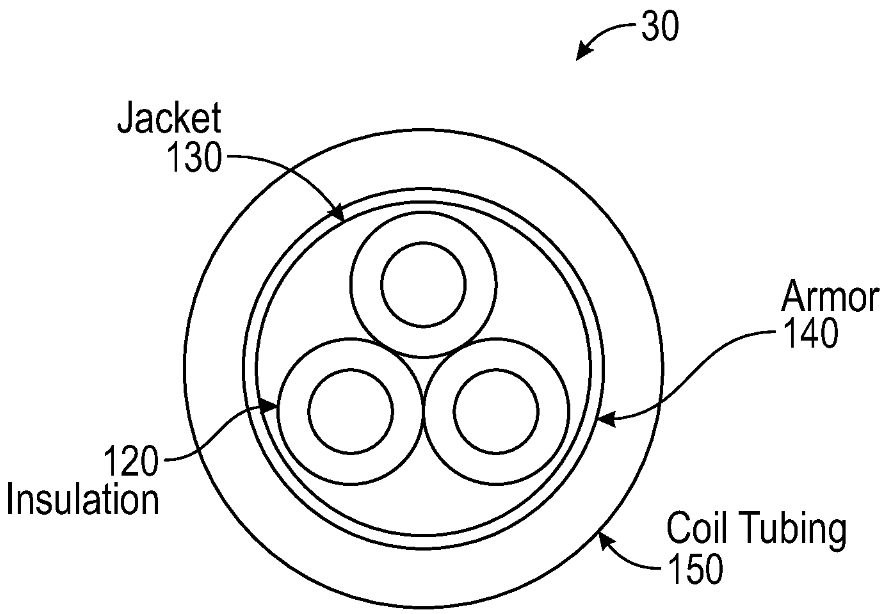
FIG. 2D shows a cross-section of an example cable including a power cable installed in coiled tubing.
Figure 2E:
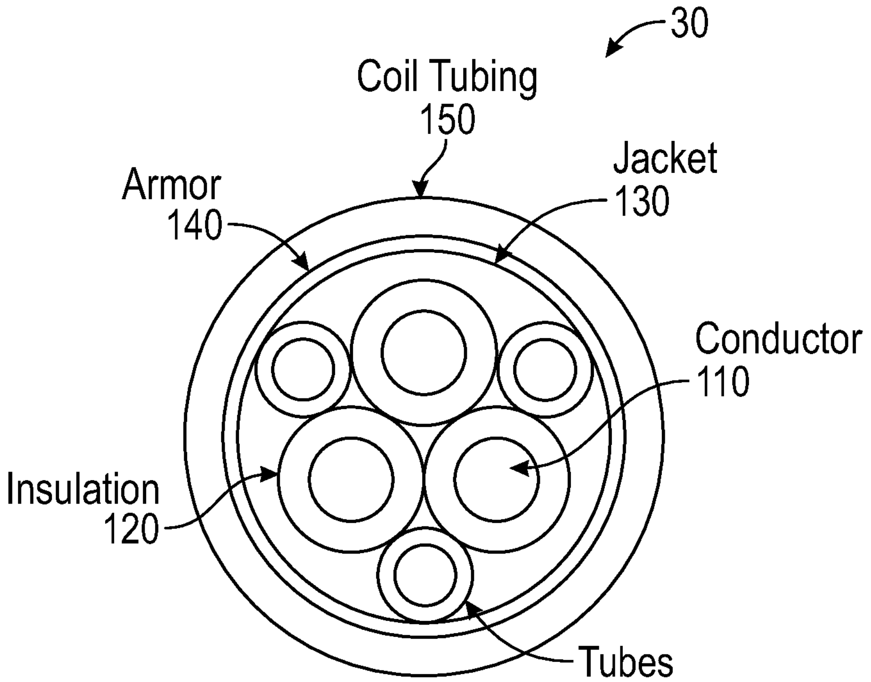
FIG. 2E shows a cross-section of an example cable including a power cable installed in coiled tubing.

The power cable 100 can be installed inside coiled tubing 150, as shown in FIGS. 2D and 2E, to create a cable 30, which can be used for deployment of an ESP in a wellbore. While traditional power cables 100 are not load-bearing on their own, installation of the power cable 100 in coiled tubing 150 can allow the cable 30 to be load-bearing and support the ESP string. Some existing cables 30 are formed by injecting the power cable 100 into pre-formed coiled tubing 150. The cable 30 then undergoes a slack management process in which the power cable 100 forms a helix inside the coiled tubing 150. Pressure of the power cable 100 helix against an inner surface of the wall of the coiled tubing 150 provides friction to suspend the power cable 100 in the coiled tubing 150 and allow the coiled tubing 150 to support the weight of the power cable 100 and the ESP. However, such a configuration requires a large diameter coil tubing 150 to provide sufficient room for the power cable 100 to form the helix. The length of the cable is limited by the slack management capability. Additionally, pinholes or breaches in the coiled tubing 150 will communicate pressure to the surface in use.

Some other existing cables 30 are formed by swaging coiled tubing 150 around a standard round ESP cable 100. This design allows for use of a smaller coiled tubing 150. However, the armor 140 is close to the welding operation of the coiled tubing 150 during manufacturing, which transmits heat to the cable 100. Steel armor 140 can be used to protect the cable 100 during swaging, but this increases the overall cost and the cable 100 weight, thereby increasing the load on the coiled tubing 150. This design does not allow room for thermal expansion of the elastomer jacket 130, and pinholes or breaches in the coiled tubing 150 will communicate pressure to the surface in use.

According to embodiments of the present disclosure, the power cable 100 is installed in coiled tubing 150 to create a load bearing structure. The coiled tubing 150 can be swaged onto the power cable to achieve an interference fit between the power cable 100 and the coiled tubing 150. A clearance between the power cable 100 and the coiled tubing 150 is very small compared to previously available cables including a power cable installed in coiled tubing. This allows the ESP 22 to be deployed on the cable 30, for example, without the need for a workover rig. Various mechanisms, systems, and methods as described herein can be implemented to install the power cable 100 in the coiled tubing 150 and/or to transfer weight from the power cable 100 to the coiled tubing 150.

In some configurations according to the present disclosure, the armor layer 140 of the encapsulated power cable 100 is corrugated or wave-shaped. This armor layer 140 is disposed between and contacts the power cable core 102 (including the conductors 110, insulation 120, and jacket 130) and the coiled tubing 150, creating interference, e.g., friction, with the coiled tubing 150. The corrugated or wave-shaped armor layer 140 can be metallic or non-metallic. In some configurations, the corrugated or wave-shaped armor layer 140 is made of aluminum, which is advantageously light and an excellent heat dissipater. This armor layer 140 has alternating concave and convex surfaces, resulting in alternating touch or contact points of the armor layer 140 with the power cable core 102 and the coiled tubing 150. The armor layer 140 can act like a spring to generate enough friction force to secure the power cable core 102 within the coiled tubing 150 and transfer the weight of the power cable core 102 to the coiled tubing 150, while also limiting force applied during the swaging process to avoid damage to the power cable core 102 and allowing space for the power cable core 102 to expand and contract during operation without compromising its mechanical integrity.

Figure 3:
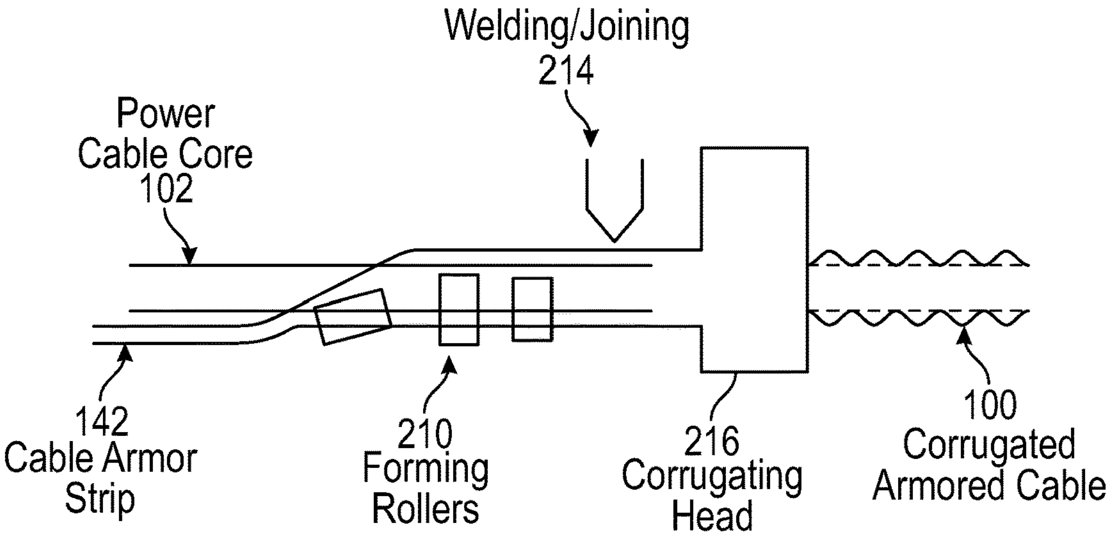
FIGS. 3-4 show an example method for forming a cable including a corrugated armor.
Figure 4:
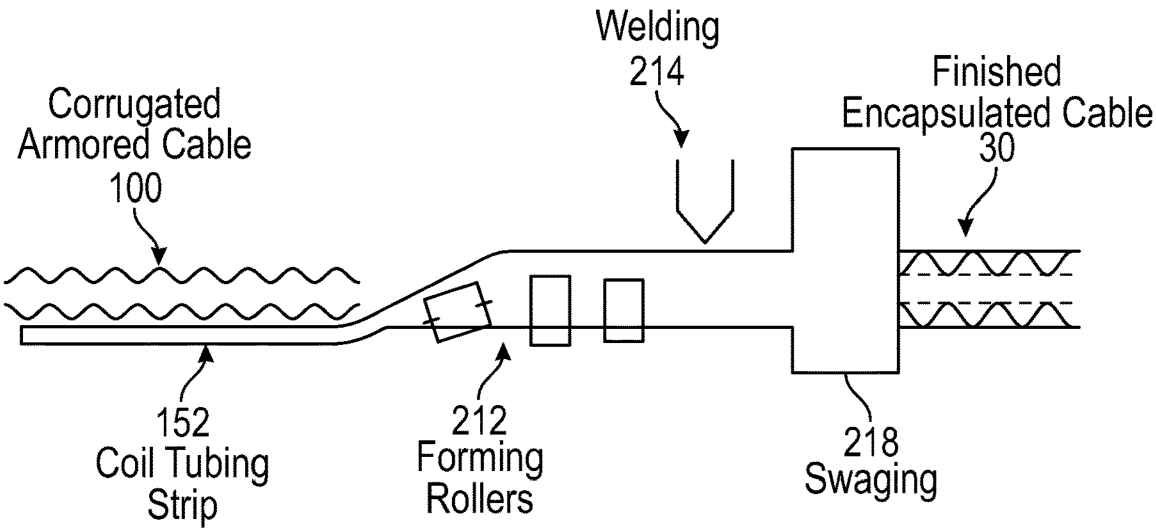

The corrugated or wave-shaped armor layer 140 can be manufactured in various ways. For example, the armor layer 140 can begin as an armor strip 142. As shown in FIG. 3, the armor strip 142 can be wrapped (e.g., cigarette wrapped) around the power cable core 102, for example, using forming rollers 210. The strip 142 can be mounted on coils that are fed into the rollers 210 simultaneously with the power cable core 102 so that the strip 142 is wrapped around the core 102. The wrapped strip 142 can be welded, soldered, or otherwise joined along its seam at a joining process or equipment 214, to form a continuous covering armor layer 140. In embodiments in which the armor layer 140 is aluminum, aluminum can be welded at a lower temperature compared to other metals, which can help protect the underlying cable core 102. The formed armor layer 140 is then corrugated, for example, by running the wrapped core 102 into corrugating dies, at process or equipment 216, thereby producing a corrugated armored cable 100. As shown in FIG. 4, the corrugated armored cable 100 is fed into forming rollers 212 simultaneously with a coiled tubing strip 152 so that the coiled tubing strip 152 is wrapped (e.g., cigarette wrapped) around the corrugated armored cable 100. The wrapped strip 152 can be welded, soldered, or otherwise joined along its seam at joining process or equipment 214 to form a continuous covering or complete wrap. The assembly of the coiled tubing 150 wrapped around the corrugated armored cable 100 is then passed through a swaging process or equipment 218, for example, passed through rollers, that sandwiches the corrugated armor 140 between the core 102 and the coiled tubing 150. This creates the final cable 30 in which an interference fit between the corrugated armor 140 and the core 102 and between the corrugated armor 140 and the coiled tubing 150 helps support the weight of the cable core 102 inside the coiled tubing 150.

Alternatively, the armor layer 140 can be formed as a strip, corrugated along or across its longitudinal axis, and then wrapped (e.g., cigarette wrapped) around the power cable core 102. In other words, the armor layer 140 can be corrugated before or after being wrapped around the power cable core 102. In some embodiments in which the armor strip 142 is corrugated first, the armor strip 142 can then be wrapped around the power cable core 102 and held in place by a temporary brace or spot weld. The assembly of the corrugated armor 140 wrapped around the core 102 is fed to a process in which the coiled tubing strip 152 is formed around the assembly. Corrugating the armor strip 142 before wrapping around the core 102 can advantageously allow for a thinner armor 140 layer, which reduces the weight of the power cable 100 and therefore cable 30, and reduces the load that the swaging of the coiled tubing 150 needs to support. Corrugating the armor strip 142 first can allow for use of materials which may not be feasible for embodiments formed by wrapping the armor strip 142 prior to corrugation, as wrapping the armor strip 142 first may require that the strip 142 be able to be welded, soldered, or otherwise joined along its seam. However, wrapping the armor strip 142 first can advantageously allow the cable 100 to be put on a reel as an intermediate step without requiring the coiled tubing 150 forming steps to be performed in line with the armor 140 forming steps.

Figure 5:
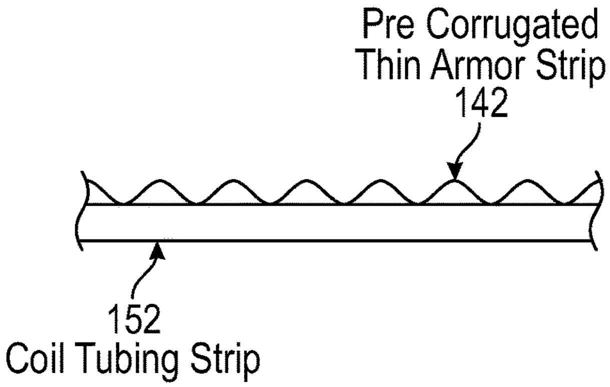
FIG. 5 shows a composite strip formed in another example method for forming a cable including a corrugated armor.

As another alternative method, in some configurations, an intermediate layer is formed by welding or otherwise joining a corrugated armor strip 142 with a coil tubing strip 152, as shown in FIG. 5. This intermediate layer, or composite strip, is then fed into rollers simultaneously with the power cable core 102 to wrap the composite strip around the core 102. The composite strip can be welded, soldered, or otherwise joined along its seam. The assembly of the composite strip around the core 102 passes through a swaging process to create the interference fit and support the weight of the core 102 with the coiled tubing 150.

Figure 6:
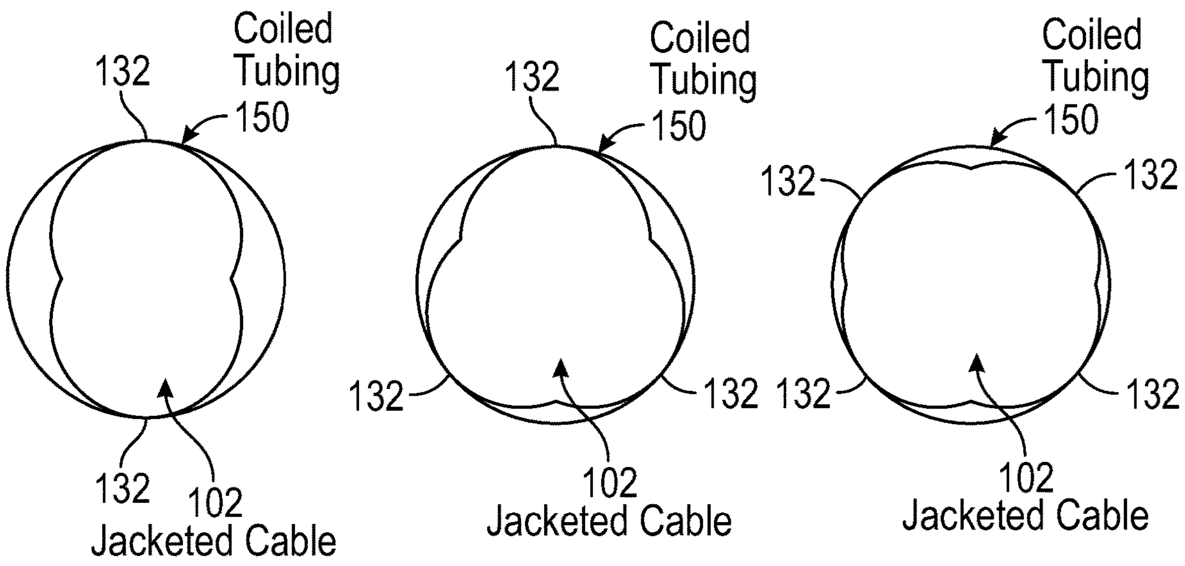
FIGS. 6-7 illustrates various example geometries of cable core jackets that create interference with coiled tubing.
Figure 7:
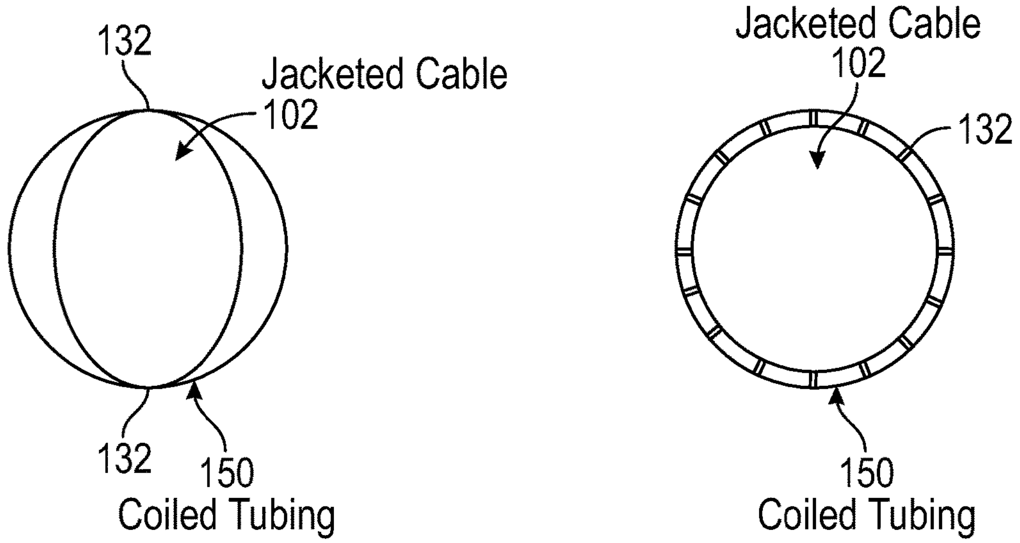

In some configurations, the weight of the power cable 100 can be transferred to the coiled tubing 150 by geometries of the jacket 130 designed and selected to create interference or friction between the cable core 102 and the coiled tubing 150. In some such configurations, the jacket 130 includes two or more portions 132 having an outer diameter, or radial dimension or extent, that exceeds an inner diameter, or radial dimension or extent, of the coiled tubing 150 (and/or a theoretical diameter of a round jacket 130). Portions 132 therefore create an interference fit or friction with the coiled tubing 150 to secure the cable core 102 in the coiled tubing 150. FIG. 6 illustrates example jacket 130 geometries including two, three, and four portions 132. Example jacket 130 geometries according to the present disclosure can include, for example, a football shape, as shown on the left in FIG. 7, a two or more lobe clover shape, for example, as shown in FIG. 6, a round jacket having two or more splines, for example as shown on the right in FIG. 7, and/or a round jacket having two or more protruding features. The shape or geometry of the jacket 130 can be the same or continuous along the entire length of the cable core 102 or can vary along the length of the cable core 102. Such configurations including interference created by jacket 130 geometry can advantageously allow for elimination of the armor 140 layer. Such configurations also leave void spaces inside the coiled tubing 150 between (radially between) the jacket 130 and the coiled tubing 150 (e.g., circumferentially between portions 132 that contact the coiled tubing 150), which advantageously allows for thermal expansion of the cable core 102 during use. Such void spaces can encourage thermal expansion of the cable core 102 to occur radially rather than axially, which can advantageously reduce tension on the cable 100 or cable 30 that might result from axial expansion.

Figure 8:
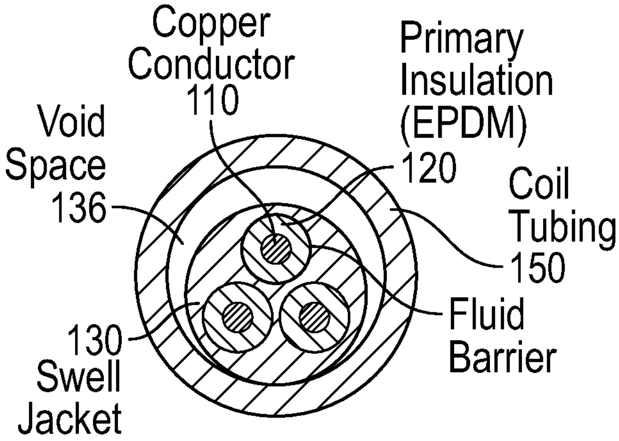
FIG. 8 illustrates a cross-sectional view of an example cable including a swelling elastomeric jacket in a non-swollen state.

In some configurations, the power cable core 102 is fixed in the coiled tubing 150 via a swelling elastomer jacket 130. As shown in FIG. 8, with the jacket 130 in its non-swollen state, a void space 136 exists between at least a portion of the cable core 102, specifically the jacket 130, and the coiled tubing 150. The coiled tubing 150 can be welded and swaged onto the cable core 102 with the swelling elastomer in its non-swollen state, which advantageously increases the distance or separation between the cable core 102 and the welding, soldering, or other joining operation along the seam of the coiled tubing 150 and helps protect the cable core 102. The void space 136 between the weld seam of the coiled tubing 150, which may be located along the top in the orientation of FIG. 8, and the jacket 130 advantageously helps minimize polymer degradation and outgassing and allows for weld penetration depths to approach 100%.

Figure 9:
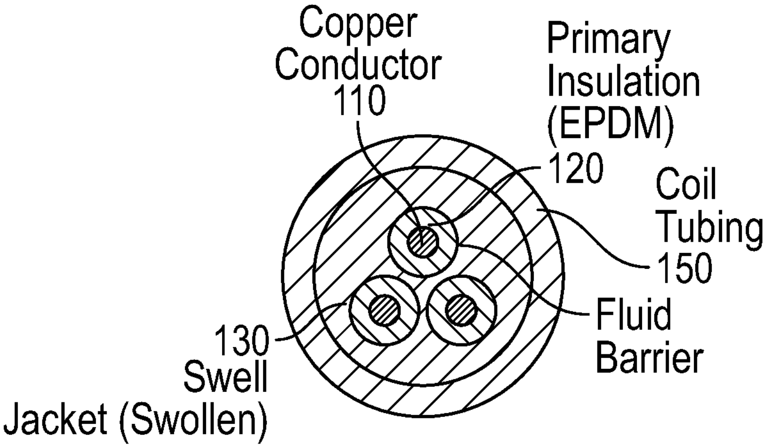
FIG. 9 illustrates a cross-sectional view of the cable of FIG. 8 with the jacket in a swollen state.
Figure 10:
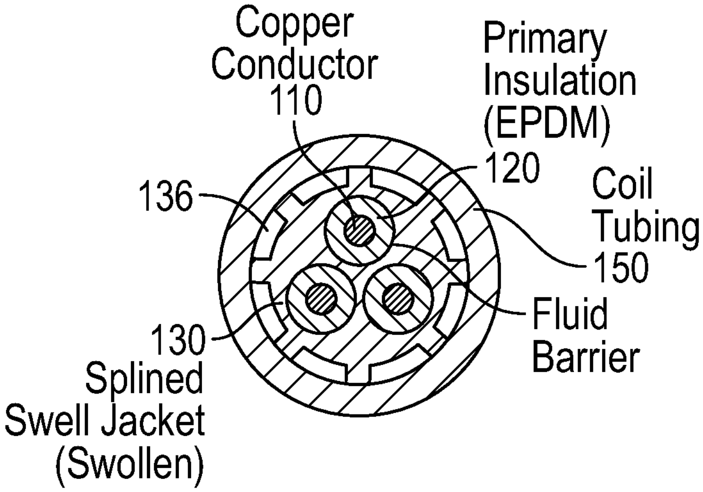
FIG. 10 illustrates a cross-sectional view of an example cable including a swelling elastomeric jacket having a splined configuration.

The jacket 130 swells into the void space 136 to contact the inner surface of the coiled tubing 150, as shown in FIG. 9, and hardens upon application of an activating swell fluid. Contact between the swollen jacket 130 and the coiled tubing 150 or outward force applied by the swollen jacket 130 to the coiled tubing 150 anchors the cable 100 within the coiled tubing 150 and transfers weight to the coiled tubing 150. As the jacket 130 swells, the cable 100 naturally becomes centralized in the tubing 150. The swelling reaction can take around 0.5 to around 14 days. In some configurations, the swelling elastomer jacket 130 is continuous along the length of the cable 100, thereby creating a continuous seal with the coiled tubing 150 along the entire length of the cable 100. The continuous seal advantageously prevents pressure transmission along the tubing 150 in the case of tubing 150 breach due to, for example, corrosion or damage. In some configurations, the swelling jacket 130 is not continuous. For example, the jacket 130 can be splined, as shown in FIG. 10. Such a splined, or other non-continuous design, can provide void spaces 136 that allow for easier transmission of the swelling fluid along the cable 150 and/or allow room for thermal expansion of the cable core 102 in use. The splines can be any shape or configuration that allows for gaps for fluid transmission.

Figure 11:
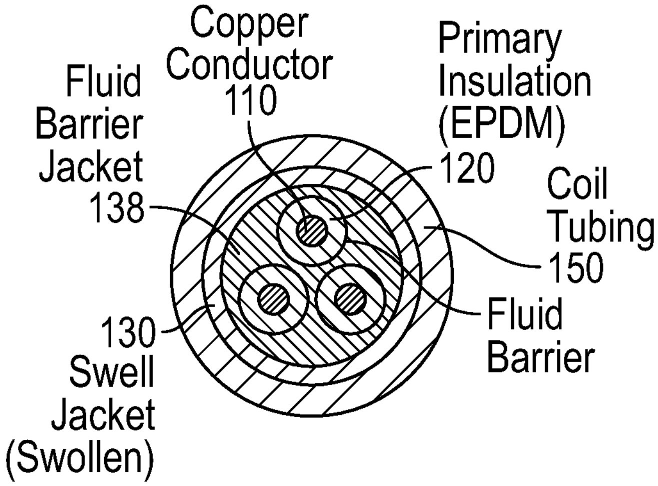
FIG. 11 illustrates a cross-sectional view of an example cable including a swelling elastomeric jacket and a barrier jacket.
Figure 12:
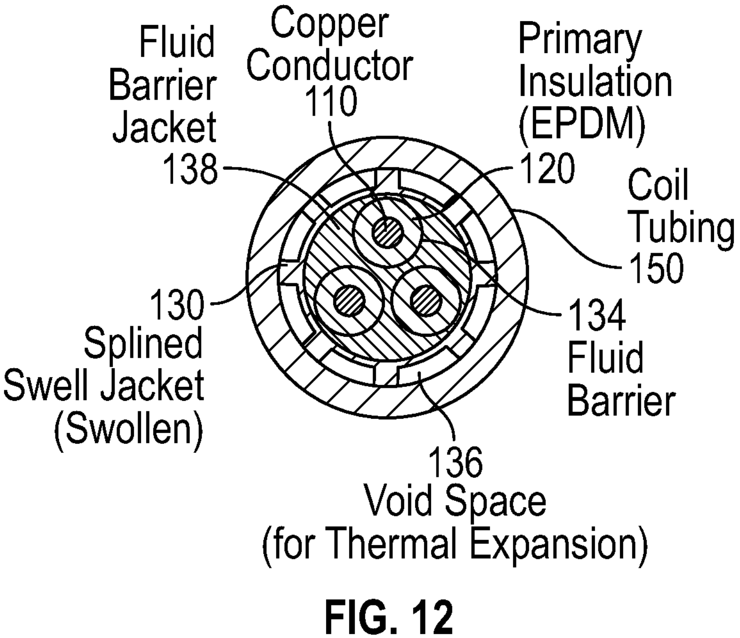
FIG. 12 illustrates a cross-sectional view of an example cable including a swelling elastomeric jacket having a splined configuration and a barrier jacket.

In some configurations, for example as shown in FIG. 11, a protective fluid barrier jacket 138 is disposed between the jacket 130 and insulation 120 surrounding the conductors 110. The barrier jacket 138 can act as a barrier to the swell fluid. The barrier jacket 138 can include a high dielectric material. The barrier jacket 138 and swell jacket 130 can be co-extruded or tandemly extruded to optimize a covalently bonded interface between them. The bonded interface anchors the swell jacket 130 to the non-swelling barrier jacket 138, which forces the swell jacket 130 to swell in a radial (not axial) direction when activated. The barrier jacket 138 can provide increased protection for the insulated conductors 110 while allowing the swell jacket 130 to swell evenly around the cable, thereby improving cable centralization within the tubing 150 and improving modeling of the swelling process. In some configurations, the cable can include a barrier jacket 138 in combination with a swell jacket 130 having a splined configuration, as shown in FIG. 12. In such a configuration, the splines can advantageously allow for an improved swell rate (due to a thinner swell jacket 130), improved core 102 centralization, and reduced amount of swell material required (which can help reduce costs).

In some configurations, the swell fluid is water or brine. In some configurations, the swell fluid is a dielectric hydrocarbon oil. The oil can advantageously help reduce or minimize internal corrosion of the coiled tubing 150 in use. Gaps or voids 136 between the coiled tubing 150 and jacket 130 can be filled with the oil, which can help prevent or inhibit water migration through the coiled tubing 150. The dielectric oil can also seal off the tubing 150 if damage or corrosion create pinholes, allowing the jacket 130 to have a "self healing" property. In some configurations, use of a dielectric hydrocarbon oil as the swell fluid could allow the cable 30 to communicate oil with the ESP motor.

Cables 30 including a swelling elastomer jacket 130 advantageously do not require an armor layer 140, which can reduce the cost and weight of the cable 100. Compared to a steel armor layer 140 the elastomer 130 advantageously increases the path to ground of the cable, improving dielectric strength. A dielectric oil used as the swell fluid can also increase the path to ground and improve the dielectric robustness of the cable 30. The additional space allowed by the elimination of the armor layer 140 can be used to upsize the conductors 110 or increase the jacket 130 size or volume for cable protection. Additional details regarding swell technology that can be incorporated in systems and methods according to the present disclosure can be found in, for example, U.S. Pat. No. 7,373,991, the entirety of which is hereby incorporated by reference herein.

In some configurations, the cable 100 includes an intermittent armor layer 140. The armor 140 can be helically wrapped around the cable core 102. The armor 140 can be wrapped or twisted loosely to form a wide helix such that the armor 140 has a small number of convolutions per foot of length of the cable 100. The helix can be non-continuous or intermittent, with gaps or spaces between sections of the armor 140 along the length of the cable 100. The various sections of armor 140 created by the gaps can have equal or varying lengths. The intermittent armor 140 can be manufactured as intermittent sections, or can be manufactured as a continuous armor 140 layer that is then cut or has sections removed to create the gaps. The armor 140 can be metal or non-metal, and the material, thickness, width, and/or other properties can be selected to improve or optimize desired flexibility. The gaps in the armor layer 140 allow the armor 140 to be compressed and expand longitudinally, similar to a spring. This spring functionality advantageously helps protect the cable core 102 during swaging of the coiled tubing 150. The intermittent armor 140 applies force radially outward on the inner surface of the coiled tubing 150 to create interference or friction with the coiled tubing 150 so support the cable 100 within the coiled tubing 150.

Figure 13:
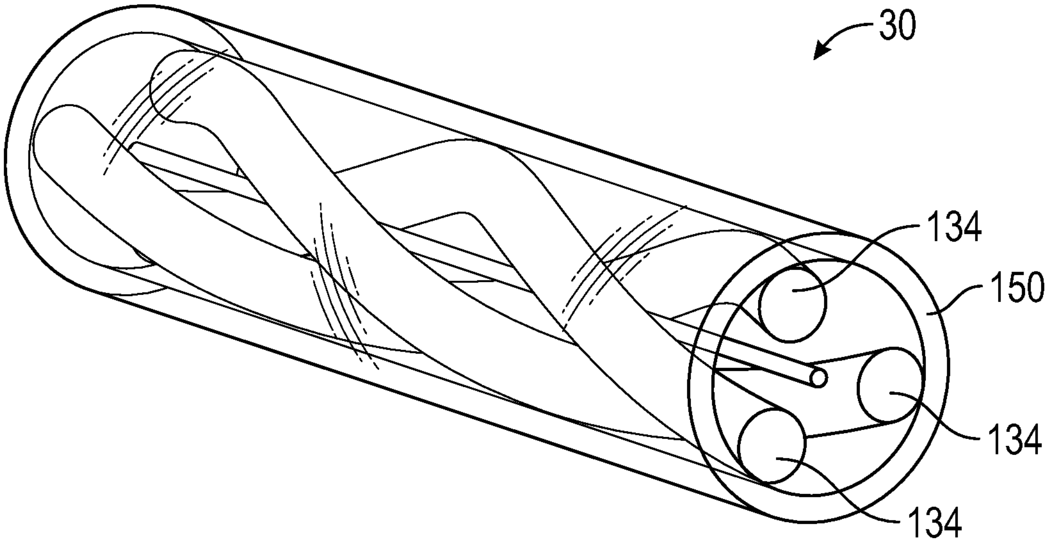
FIG. 13 illustrates an example embodiment of individually encased conductors helically wrapped and disposed in coiled tubing.
Figure 14:
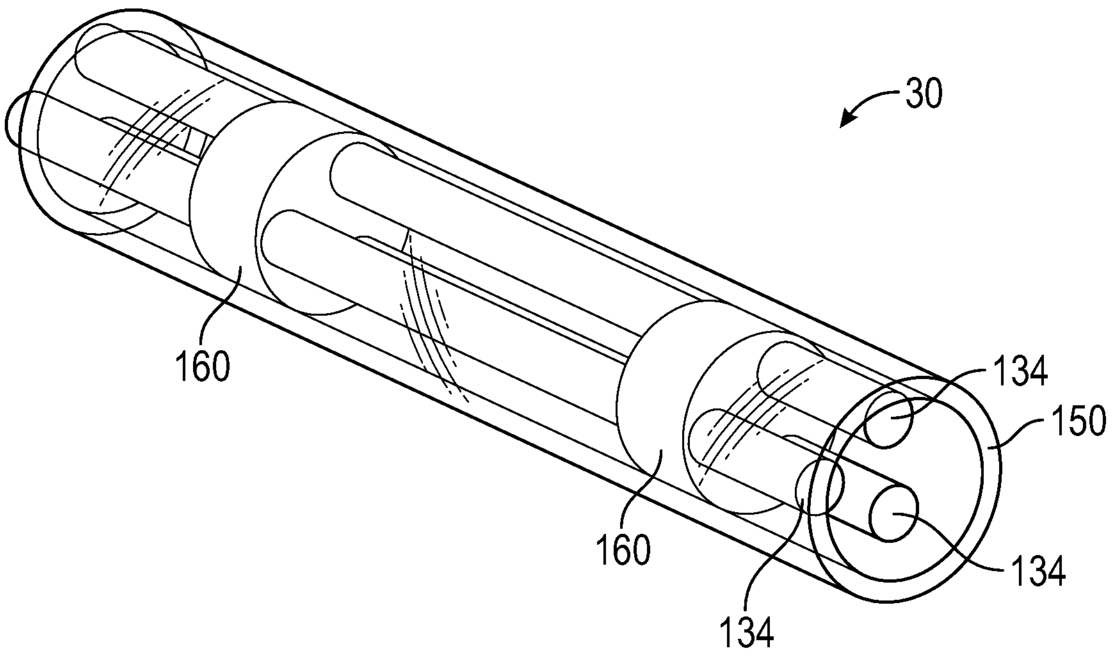
FIG. 14 illustrates an example embodiment of individually encased conductors disposed parallel to each other in coiled tubing.

FIGS. 13-14 illustrate example embodiments of cables 30 in which each conductor 110 is individually encased in a tube 134. The tubes 134 are then installed in the coiled tubing 150. The tubes 134 can be metallic or non-metallic. The tubes 134 can provide primary insulation and mechanical, gas, and fluid protection to the conductors 110. The tubes 134 can be helically wrapped or twisted around each other within the coiled tubing 150, as shown in FIG. 13. Alternatively, the tubes 134 can be disposed within the coiled tubing 150 parallel to each other, as shown in FIG. 14.

In configurations in which the tubes 134 are helically wrapped or twisted, the tubes 134 can be loosely, or not tightly, twisted such that an overall outer diameter of a circle encircling the tubes 134 in cross-section is equal to or slightly greater than the inner diameter of the coiled tubing 150. The tubes 134 therefore contact the inner surface of the coiled tubing 150 at various locations or intervals along the length of the cable 30 thereby providing interference or friction to support the weight of the tubes 134 and transfer the weight of the conductors 110 and tubes 134 to the coiled tubing 150. In some configurations, the tubes 134 can be tightly helically wrapped around each other such that the twisted bundle of tubes 134 naturally forms a helix inside of the coiled tubing 150, thereby contacting the inner surface of the coiled tubing 150 to provide the interference or friction to support the weight of the tubes 134 and conductors 110.

In configurations in which the tubes 134 are disposed parallel to each other, collars 160 can be installed at various intervals along the length of the cable 30. As shown, the collars 160 are disposed around the tubes 134 and between the tubes 134 and the inner surface of the coiled tubing 150. The collars 160 help support the tubes 134 and conductors 110. The collars 160 provide a mechanical bond, resistance, interference, and/or friction with the inner surface of the coiled tubing 150 to support the weight of the conductors 110 and transfer the weight of the conductors 110 and tubes 134 to the coiled tubing 150. The collars can vary in number and can be disposed at equal (or consistent) or un-equal (or varying) intervals. Collars 160 could also be employed in configurations in which the tubes 134 are helically wrapped or twisted, for example as shown in FIG. 13, to provide additional mechanical support to the conductors 110.

Figure 15:
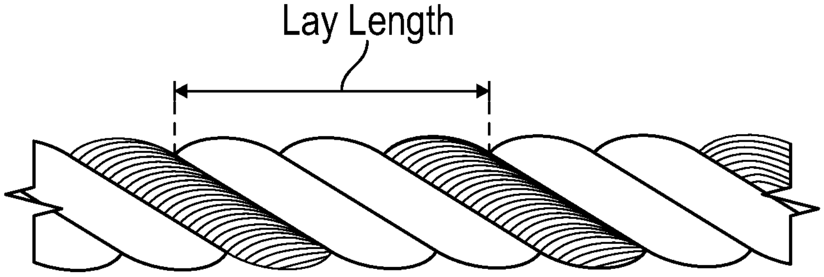
FIG. 15 illustrates an example embodiment of a stretch resistant cable.

With various cables 30 including a power cable 100 installed in coiled tubing 150, such as the various cables 30 described herein, as the cable 30 is loaded, for example, with the ESP and/or other components, the cable 30, e.g., the coiled tubing 150 and/or the power cable 100, may stretch longitudinally. In some configurations, for example in combination with any of the embodiments shown and described herein, a tighter lay length during manufacturing of the cable 30 can advantageously build in cable slack and helps prevent or inhibit stress on the cable 30. As shown in FIG. 15, multiple power carrying members can be wrapped around each other or twisted together within the coiled tubing 150. The pitch of the twist is identified as the Lay Length in FIG. 15. The twist serves as a built-in slack in the cable 100 that can compensate for elongation of the coiled tubing 150, thereby preventing or inhibiting excessive strain and stress on components in the cable 100.

Figure 16:
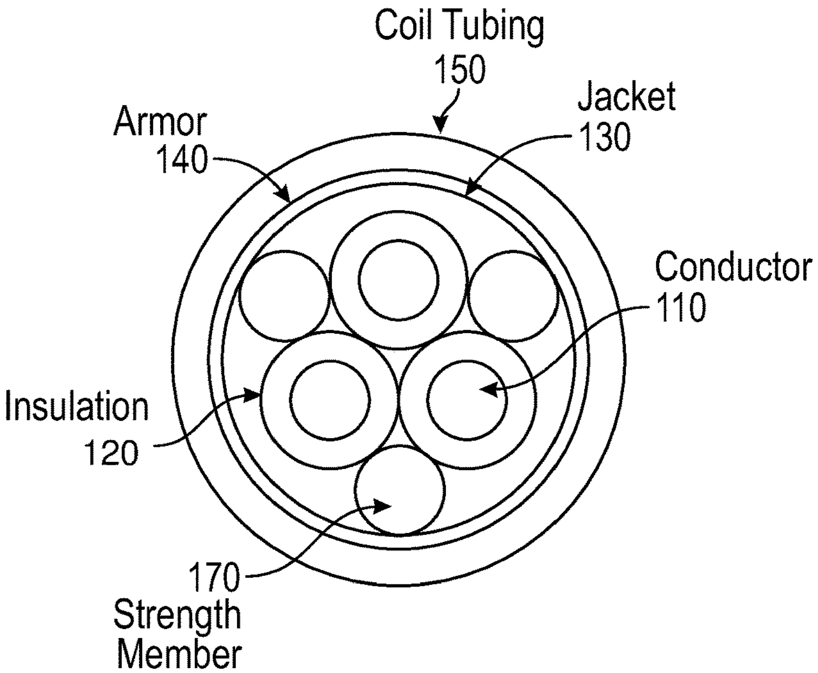
FIG. 16 illustrates a cross-sectional view of an example embodiment of a cable including internal strength members embedded in a power cable core of the cable.

In some configurations, the power cable core 102 can include one or more embedded internal strength or load bearing members 170, such as wire rope. The strength members 170 are embedded in the jacket 130 of the power cable core 102, for example, during the extrusion process that forms the jacket 130, for example as shown in FIG. 16. Such a configuration advantageously allows the load bearing function of the cable 30 to be split or shared between the coiled tubing 150 and the embedded strength members 170. This can reduce the load bearing required of the coiled tubing 150, thereby allowing the coiled tubing 150 to be thinner, and therefore less expensive. The internal strength members 170 can be made of high strength materials (e.g., hardened steel) selected primarily based on strength, as the internal strength members 170 will only be subjected to atmosphere inside the coiled tubing 150 and will not need to satisfy severe corrosion requirements as they will not come into contact with well fluids.

Figure 17:
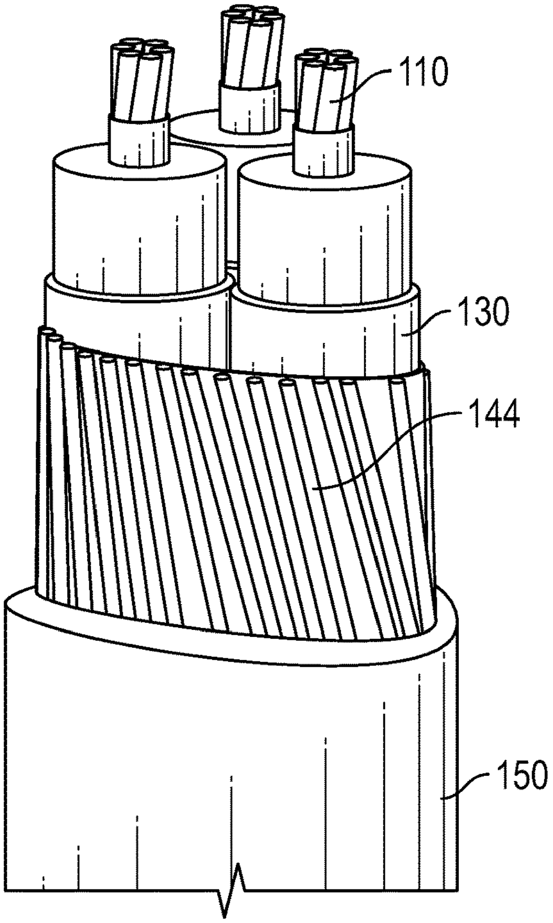
FIG. 17 illustrates an example embodiment of a power cable including a single layer of wire armor.
Figure 18:
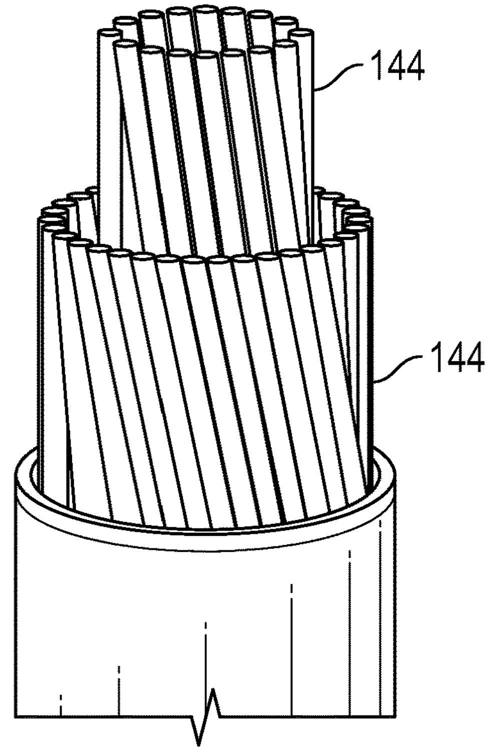
FIG. 18 illustrates an example embodiment of a power cable including a double layer of wire armor.

In various systems and methods, for example as described herein, coiled tubing 150 is formed around the power cable 100. Wire armor 144 can be disposed between the power cable core 102 and the coiled tubing 150 and used to protect the power cable 100 during manufacturing and during ESP deployment. The wire armor 144 can be used instead of traditional steel tape armor 140 or various armor 140 configurations as described herein. The cable 100 can include a single layer of wire armor 144, for example as shown in FIG. 17, two layers of wire armor 144, for example as shown in FIG. 18, or more than two layers of wire armor 144. In configurations having two or more layers of wire armor 144, the layers can be oriented in the same, or different, for example opposite, directions relative to each other. The wire armor 144 can cover the entire outer surface of the power cable 100 or only a portion or portions thereof. Only partially covering the power cable 100 can leave gaps that can advantageously allow for and accommodate thermal expansion of the power cable 100, e.g., the jacket 130, during operation. Cross sections of the wires of the wire armor 144 can be circular, rectangular, or another shape. The wires can be solid or stranded. Stranded wires can be compressed during manufacturing, which can advantageously help protect the cable 100 from damage. The wires can be made of or include steel, copper, aluminum, and/or other suitable materials. The wire armor 144 can share the load bearing function of the cable 30 with the coiled tubing 150, thereby advantageously allowing the wall thickness, weight, and cost of the cable 30 to be reduced.

Another option for protecting the cable 100 during manufacturing and/or ESP deployment is non-metallic armor 180. The non-metallic armor 180 can be used instead of traditional steel tape armor 140 or various armor 140 configurations as described herein. The non-metallic armor 180 can advantageously reduce the cost and weight of the cable 30. The non-metallic armor 180 can be made of or include thermoplastic polymer, fiber weaved tape, foamy material, and/or any other suitable materials. A foamy material can be compressed during manufacturing, thereby advantageously preventing or inhibiting damage to the cable 100 during manufacturing. The non-metallic armor 180 can cover the entire outer surface of the power cable 100 or only a portion or portions thereof. Only partially covering the power cable 100 can leave gaps that can advantageously allow for and accommodate thermal expansion of the power cable 100, e.g., the jacket 130, during operation. The non-metallic armor 180 can be spirally wrapped or extruded around the power cable 100 during manufacturing.

In some configurations, a non-corrosive layer or cladding can be applied to or on the outer surface of the coiled tubing 150. Such a non-corrosive layer can be applied to, for example, any of the cable 30 embodiments described herein. The non-corrosive layer forms the primary barrier to the well fluid in use. The non-corrosive layer therefore must maintain mechanical integrity in varying conditions of fluids, gases, temperatures, pressure, etc. to protect the underlying coiled tubing 150 and/or power cable 100, and therefore the electrical integrity of the cable 30 and its ability to perform its intended function(s). Corrosion resistant alloys (CRAs), for example, nickel alloys and highly alloyed steel, exhibit good resistance to varying conditions in a well, including resistance to a variety of well fluids. CRAs could therefore be used in a variety of well conditions. However, CRAs can be costly and are limited as to their ultimate tensile strength, which limits load ratings of CFAs in a load bearing cable application. It may thus not be feasible to form coiled tubing 150 entirely from CRAs.

Therefore, in some configurations, the non-corrosive layer is created by depositing a thin layer of CRA material over an underlying carbon steel layer. The base metal can therefore be optimized for strength, cost, and/or manufacturability. The non-corrosive layer can be deposited on the base metal by, for example, flame spray, high velocity oxygen fuel (HVOF) spray, or another suitable method. In such a process, the CRA material in powder form is injected into a nozzle and ignited by a combustible gas flowing at high velocity along with oxygen. This causes the powder particles to melt and gain high velocity as the particles pass through the nozzle. Droplets of molten metal are impinged on a substrate surface, which has been prepared with craters to accept the molten metal. Upon impact, the molten metal particles flow into the craters and eventually solidify, creating a layer of the material over the substrate. Several passes of this process and the material can be made over the substrate. Complete coverage of the substrate with the material creates an impervious layer of the CRA. However, even if perfect, complete coverage is not attained, the coating still includes several layers of material, which creates an extremely tortuous path for any fluid to penetrate to reach the substrate. The resulting coiled tubing 150 therefore has a composite material construction having a less expensive and stronger underlying material (of the substrate layer, e.g., carbon steel) with a corrosion resistant outer layer.

Figure 19:
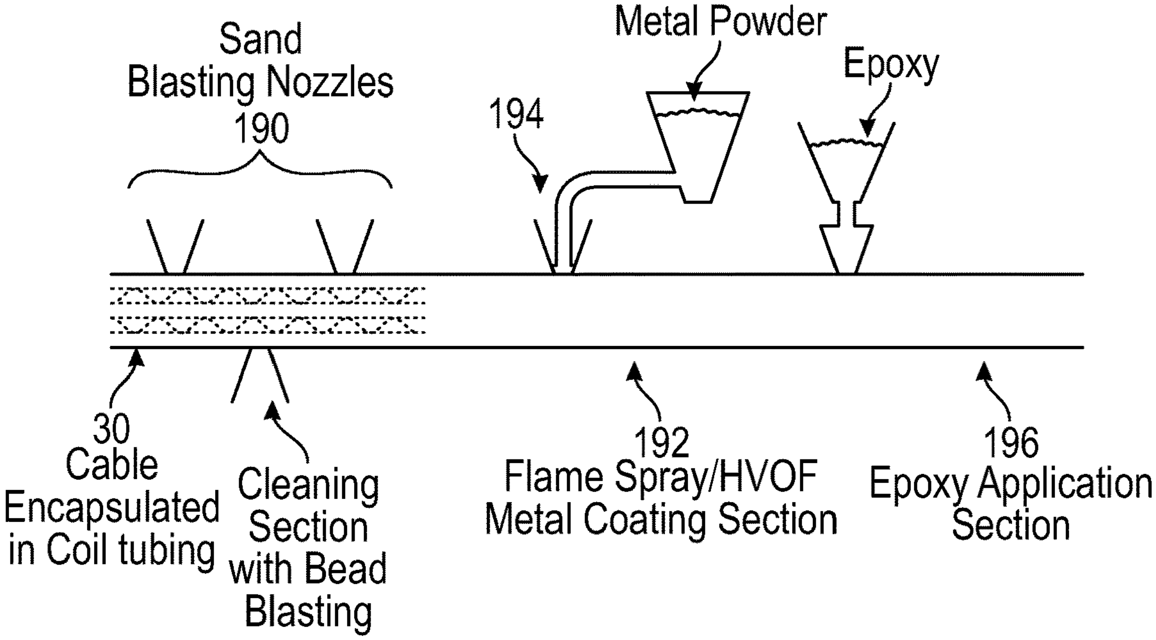
FIG. 19 illustrates an example method for applying a non-corrosive layer on coiled tubing.

FIG. 19 illustrates an example manufacturing process for a cable 30 having a non-corrosive or corrosion-resistant outer layer. The coiled tubing 150, made of the substrate material, e.g., carbon steel, is formed (e.g., wrapped), welded (or soldered or otherwise joined along its seam), and swaged around the power cable 100 to form cable 30. As shown in FIG. 19, the cable 30 passes through a preparation process 190 where the outer surface of the cable (i.e., the outer surface of the coiled tubing 150) is washed to remove an oxide layer and residue from the welding and swaging processes. The outer surface is bead blasted to the required specification to create craters in the outer surface. The cable 30 is then passed through a coating process or equipment 192, where one or more flame spray heads 194 are arranged and operate to provide full coverage of the outer surface. The flame spray heads are loaded with the required fuel and supply of CRA powder. The number of spray heads included can vary depending on the speed of the process and the number of layers of material required on the outer surface of the cable 30. Once the CRA layer is applied, a final, outer epoxy layer is coated on the outer surface of the cable 30 with an epoxy application process or equipment 196. The epoxy can fill remaining crevices to prevent or inhibit well fluid from infiltrating to the underlying substrate layer in use.

Figure 20A:
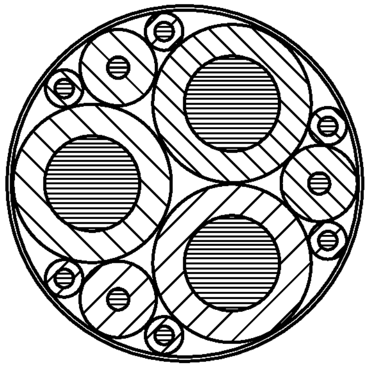
FIGS. 20A-20E illustrate stages of manufacturing an example cable.
Figure 20B:
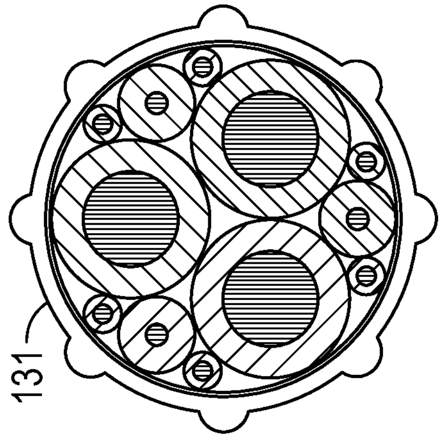
Figure 20C:
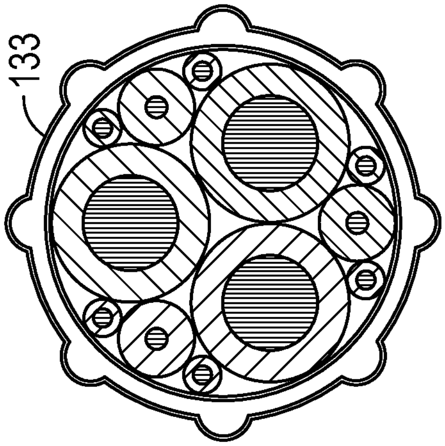
Figure 20D:
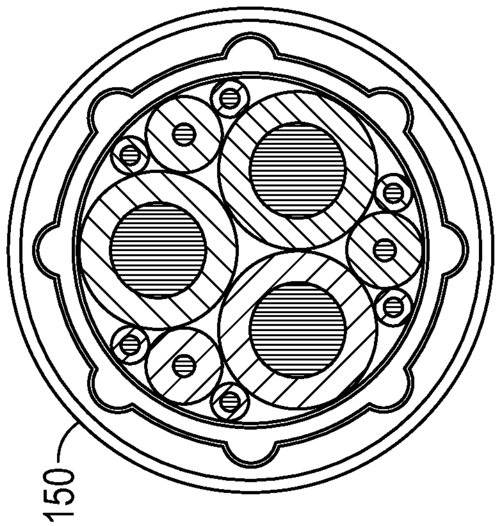
Figure 20E:
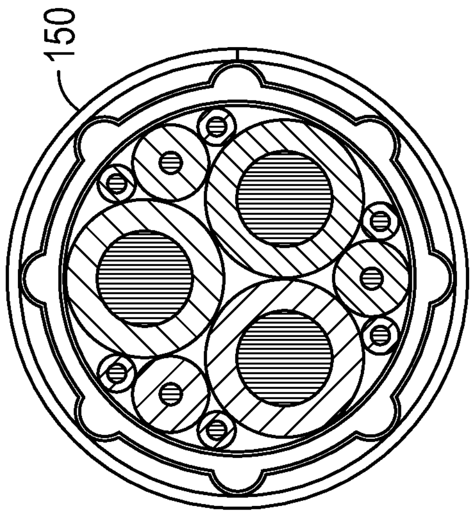

FIGS. 20A-20E illustrate cross-sections of a cable during stages of manufacturing another example cable 30. A layer of MFA and/or Tefzel 131 is extruded over a cable core (shown in FIG. 20A), which may or may not include a jacket 130. In other words, the MFA and/or Tefzel layer 131 can be used instead of or in addition to jacket 130. As shown in FIG. 20B, the layer 131 has a smooth, circular base adjacent the core and protrusions extending radially outward from the base at intervals around the circumference of the core to form a ridged profile. In the illustrated configurations, the protrusions have a circular-segment profile. The protrusions can be evenly spaced around the circumference of the core. In some configurations, an overlapping layer of ceramic heat-shielding tape 133 is wrapped around the layer 131 and conforms to the profile of the layer 131, as shown in FIG. 20C. As shown in FIG. 20D, the coiled tubing 150 is formed around the layer 131 (and optional tape 133). A void between the layer 131 (or tape 133) and the coiled tubing 150 can be used to protect the cable core during welding, soldering, or joining of the coiled tubing 150 seam. If desired, the seam-welded coiled tubing 150 can be pressure tested and any gaps in the weld repaired. The coiled tubing 150 is then swaged or drawn down to fit snugly against the ridges of the layer 131, as shown in FIG. 20E. The completed cable 30 can be pressure tested using the spaces or voids between the layer 131 (or tape 133) and coiled tubing 150 formed by intervals between protrusions of the layer 131.

Figure 21C:
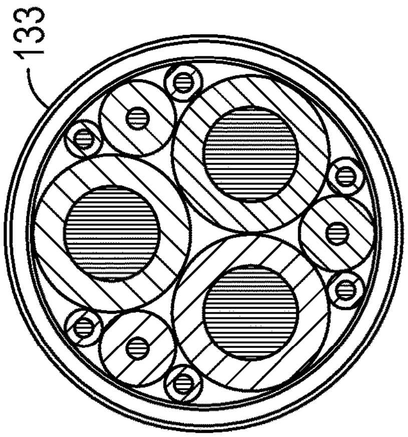
FIGS. 21A-21I illustrate stages of manufacturing an example cable.
Figure 21B:
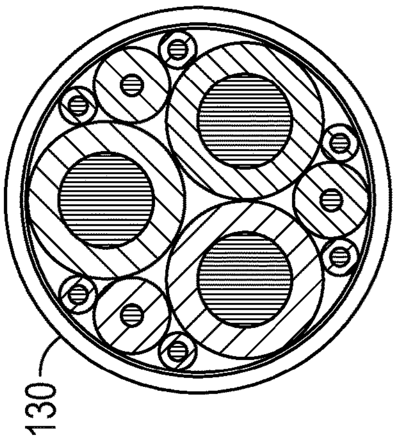
Figure 21A:
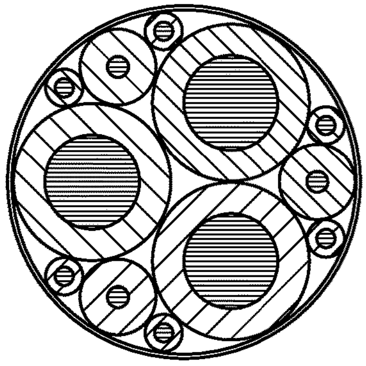
Figure 21F:
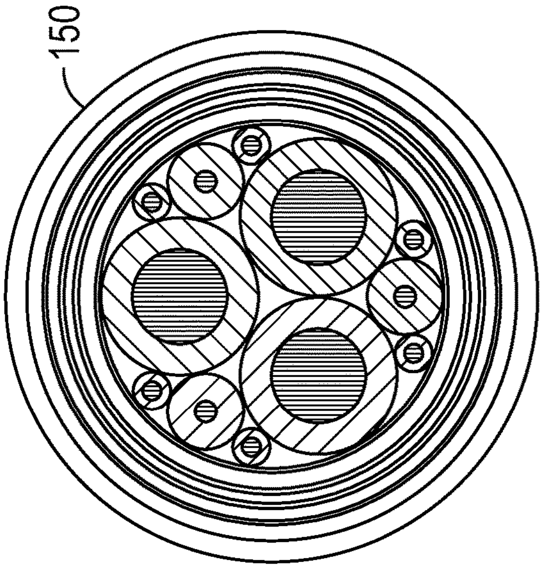
Figure 21E:
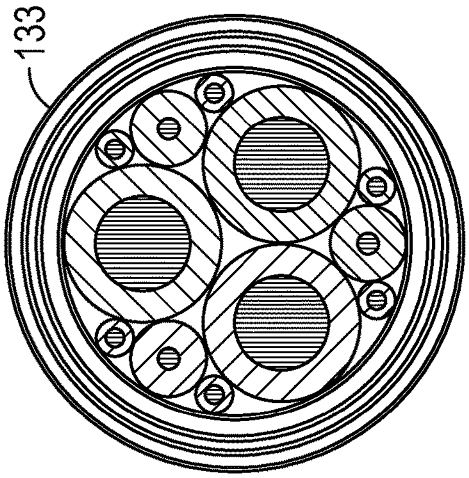
Figure 21D:
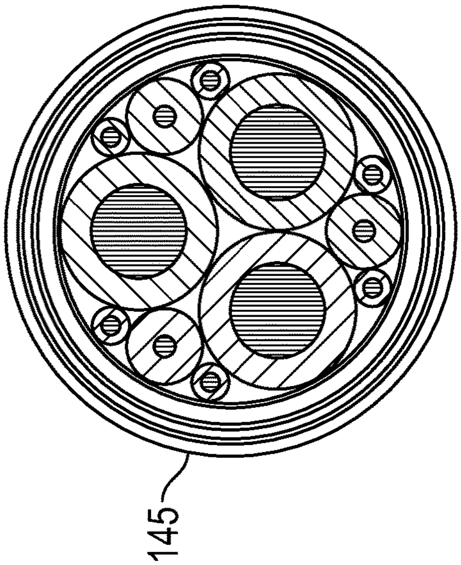
Figure 21H:
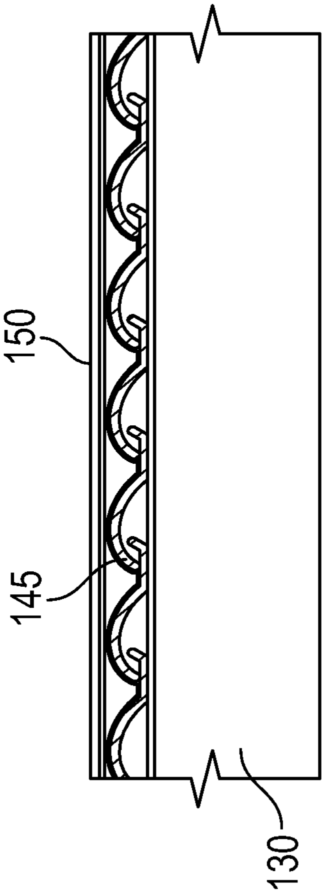
Figure 21G:
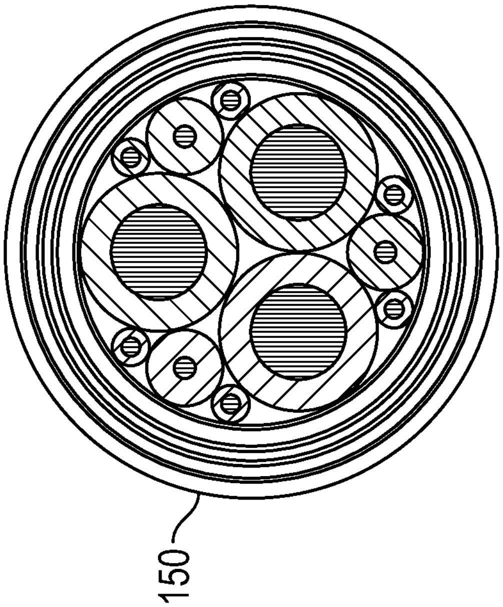
Figure 21I:
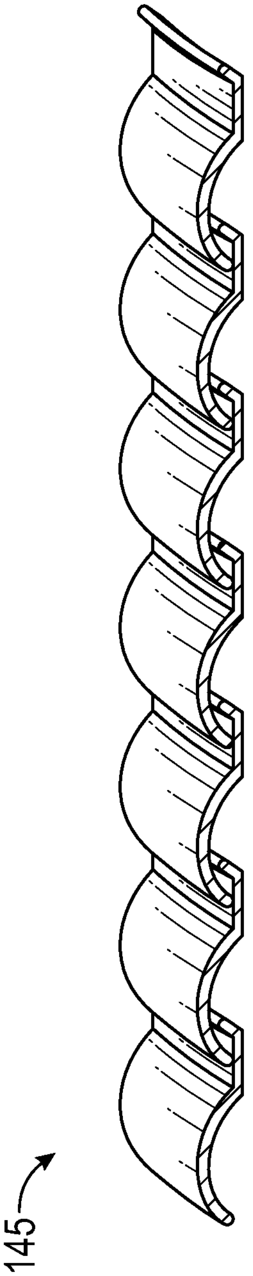

FIGS. 21A-21I illustrate cross-sections of a cable during stages of manufacturing another example cable 30. A smooth jacket 130 is extruded over a core (shown in FIG. 21A) to form power cable core 102 as shown in FIG. 21B. A layer of overlapped ceramic heat-shielding tape 133 can be wrapped around the jacket 130, as shown in FIG. 21C. A layer of interlocking galvanized steel heat-shielding tape 145 is applied over the jacket 130 (or tape 133 if present), as shown in FIG. 21D. As shown in FIG. 21I, the layer 145 has an interlocking arched profile. The layer 145 advantageously acts as a heat shield for the cable core 102 during manufacturing and/or repairs. The arched profile can also provide channels (spaces or voids) that can be used for pressure testing in the completed cable 30. In some configurations, a layer of ceramic heat-shielding tape 133 is applied over and molded to the outer profile of the layer 145 as shown in FIG. 21E. As shown in FIG. 21F, the coiled tubing 150 is formed around the layer 145 (and optional tape 133). A void between the layer 145 (or tape 133) and the coiled tubing 150 can be used to protect the cable core during welding, soldering, or joining of the coiled tubing 150 seam. If desired, the seam-welded coiled tubing 150 can be pressure tested and any gaps in the weld repairs. The coiled tubing 150 is then swaged or drawn down to fit snugly against the layer 145 (or tape 133), as shown in FIG. 21G. The completed cable 30 can be pressure tested using the spaces or voids created by the arched profile of the layer 145.

In various configurations according to the present disclosure, for example in the configurations shown and/or described herein, a heat-shielding or heat dissipating layer of non-metallic material can be disposed between a power cable core 102 (or an armor layer 140, if present) and coiled tubing 150. The layer of non-metallic material can be, for example, in strip form and applied on or about the power cable or an extruded layer extruded onto or about the power cable. For example, such a tape or extruded heat-shielding layer could be used in place of or in addition to optional tape 133 (shown in, for example, FIGS. 20A-20E and 21A-21I). Such a tape or extruded heat-shielding layer can also be used in various other example configurations described herein and/or in other cables 30 in which a tube, such as coiled tubing 150, is welded, soldered, or joined about a cable or cable core.

The heat-shielding or heat dissipative layer can be a heat resistant ceramic, glass fabric, or composite tape or film. This layer insulates the cable core or cable from the heat of the welding, soldering, or other joining operation of the coiled tubing 150. If the layer is in strip form, the layer can be wrapped, e.g., helically wrapped, about the power cable core 102 (or armor layer if present) or can be applied to the power cable core 102 (or armor layer if present) longitudinally and oriented below the seam of the coiled tubing 150. If the layer is an extruded layer, the layer can act as a sacrificial layer that absorbs, and could be damaged by, heat during the welding, soldering, or joining operation without disrupting the function or capability of the cable or cable core. Such an extruded layer can be any sufficiently heat resistant polymer, for example, a polymer with excellent thermal insulation properties or a phase-change based insulation system. Additionally or alternatively, the extruded layer can act as a heat dissipative layer that allows the heat of the welding, soldering, or joining operation to be dissipated in the X-Y plane (e.g., axially or circumferentially around the outside of the jacket 130 or cable core 102) without allowing heat dissipation in the Z-direction. This can be achieved by incorporating a high volume fraction of high aspect ratio thermally conductive fillers in a polymer based composite.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A cable for a cable-deployed ESP system, the cable comprising:
- coiled tubing;
- a corrosion resistant cladding applied to an outer surface of the coiled tubing;
- an epoxy layer applied over the corrosion resistant cladding; and
- a power cable core disposed within the coiled tubing, the power cable core comprising:
  - one or more conductors;
  - insulation surrounding each of the one or more conductors; and
  - a jacket surrounding the insulation and the one or more conductors;
- wherein the coiled tubing is formed around the power cable core.

2. The cable of claim 1, further comprising a corrugated armor layer disposed between the power cable core and the coiled tubing.

3. The cable of claim 1, wherein the jacket has a cross-sectional geometry comprising two or more portions having an outer diameter that exceeds an inner diameter of the coiled tubing and that contact an inner surface of the coiled tubing to create an interference fit with the coiled tubing and secure the power cable core in the coiled tubing.

4. The cable of claim 1, wherein the jacket comprises a material configured to swell in response to an activating fluid.

5. The cable of claim 4, further comprising a barrier jacket surrounding the insulation and disposed between the insulation and the jacket, the barrier jacket configured to anchor the jacket such that the jacket swells radially outwardly rather than longitudinally in response to the activating fluid.

6. The cable of claim 4, wherein the jacket has a splined cross-sectional geometry such that the cable comprises voids between portions of the jacket and the coiled tubing when the jacket is in a swollen state.

7. The cable of claim 4, wherein the activating fluid is water or brine.

8. The cable of claim 4, wherein the activating fluid is hydrocarbon oil.

9. A method of forming the cable of claim 4 comprising forming the coiled tubing around the power cable core and welding along a seam of the coiled tubing with the jacket in a non-swollen state such that there is a void between at least a portion of the jacket and the coiled tubing.

10. The method of claim 9, further comprising introducing the activating fluid into the cable, causing the jacket to swell into the void and anchor the power cable core against an inner surface of the coiled tubing.

11. The cable of claim 1, further comprising one or more strength members embedded in the jacket.

12. The cable of claim 11, wherein the strength members comprise wire rope.

13. The cable of claim 1, further comprising wire armor disposed between the power cable core and the coiled tubing.

14. The cable of claim 1, wherein the corrosion resistant cladding is applied to the coiled tubing via flame spray or high velocity oxygen fuel spray.

15. The cable of claim 1, wherein the jacket comprises a base having a circular cross-sectional profile and a plurality of protrusions projecting radially outwardly from the base.

16. The cable of claim 1, further comprising a layer of interlocking galvanized steel heat-shielding tape disposed between the power cable core and the coiled tubing.

17. A cable for a cable-deployed ESP system, the cable comprising:

coiled tubing; and a power cable core disposed within the coiled tubing, the power cable core comprising:

one or more conductors;

insulation surrounding each of the one or more conductors; and a jacket surrounding the insulation and the one or more conductors, wherein the jacket has a cross-sectional geometry comprising two or more portions having an outer diameter that exceeds an inner diameter of the coiled tubing and that contact an inner surface of the coiled tubing to create an interference fit with the coiled tubing and secure the power cable core in the coiled tubing;

wherein the coiled tubing is formed around the power cable core.

18. A cable for a cable-deployed ESP system, the cable comprising:

coiled tubing; and a power cable core disposed within the coiled tubing, the power cable core comprising:

one or more conductors;

insulation surrounding each of the one or more conductors;

a jacket surrounding the insulation and the one or more conductors, wherein the jacket comprises a material configured to swell in response to an activating fluid; and a barrier jacket surrounding the insulation and disposed between the insulation and the jacket, the barrier jacket configured to anchor the jacket such that the jacket swells radially outwardly rather than longitudinally in response to the activating fluid;

wherein the coiled tubing is formed around the power cable core.

19. The cable of claim 18, wherein the jacket has a splined cross-sectional geometry such that the cable comprises voids between portions of the jacket and the coiled tubing when the jacket is in a swollen state.

20. The cable of claim 18, wherein the activating fluid is water, brine, or hydrocarbon oil.

* * * * *